Oct. 4, 1927.
L. R. FERGUSON
WHEEL GAUGE
Filed Aug. 4, 1925
1,644,055
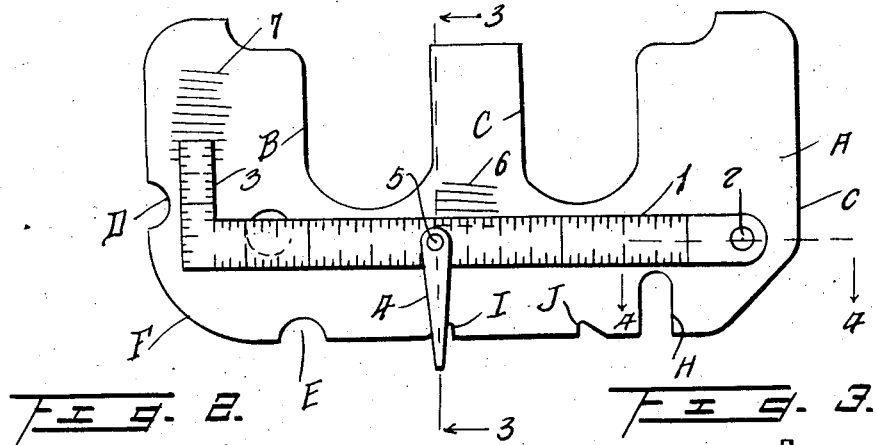
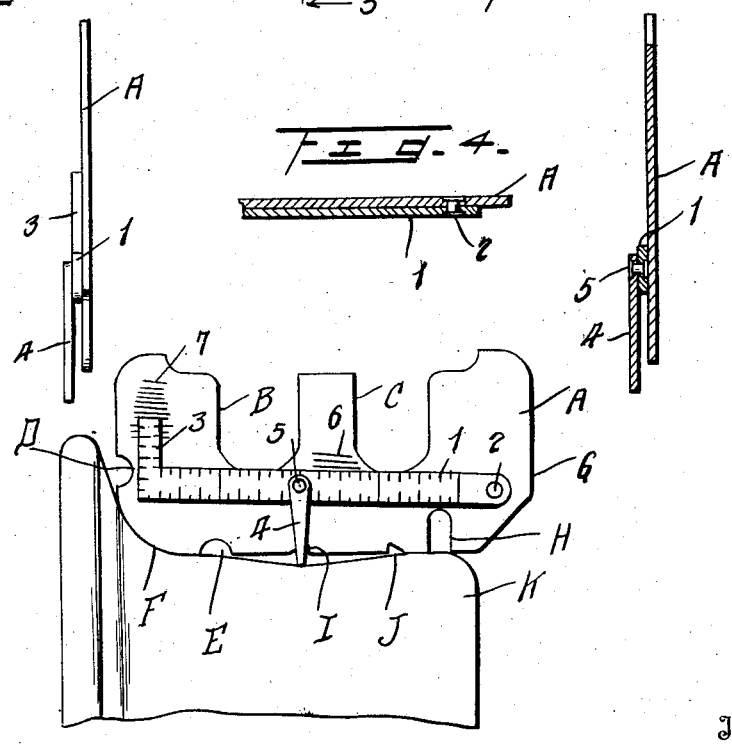
Inventor
L. R. Ferguson,
By
Attorney Patented Oct. 4, 1927.

1,644,055

UNITED STATES PATENT OFFICE.

LUTHER R. FERGUSON, OF HINTON, WEST VIRGINIA.

WHEEL GAUGE.

Application filed August 4, 1925. Serial No. 48,102.

The invention relates to gauges for testing locomotives and car wheels and has for its principal object the provision of an attachment to the standard wheel gauge comprising a bar pivotally secured to said standard gauge and having an angular offset on its free end, and an arm pivotally secured to said bar intermediate of its ends, said attachment to be used for various tests and measurements to determine serviceability of locomotives and car wheels and also to assist in truing the tires on the wheel hubs preliminary to shrinking the tires thereon.

The invention will be described in detail hereinafter and will be found illustrated in the accompanying drawings in which Figure 1 is a plan view of a standard wheel gauge showing the attachment applied thereto, Figure 2 an end edge view, Figure 3 a transverse sectional view on the plane indicated by the line 3—3 of Figure 1, Figure 4 a detail sectional view on the plane indicated by the line 4—4 of Figure 1, and Figure 5 a view showing the application of the attachment in measuring the depth of groove cut in the wheel tire by the track.

In the drawings similar reference characters will be used to designate corresponding parts throughout the several views.

The invention is applied to a standard wheel gauge designated generally at A, and having notches B and C used for determining the depth of the wheel flange, B being adaptable for flanges an inch wide, while C is used for fifteen sixteenths of an inch wide flanges. The curved surface from notch D to notch E and designated F is to test the curvature between the flange and the wheel tread, while the straight edge portion between notch E and the farther end of the plate A designated G is used to test chipped wheels, any wheel that is chipped so that the chipped portion extends inside of the notch E being defective. The straight edge between the notch E and notch H is used to measure the extent of flat spots on wheels, the angular notches I and J indicating inches from the notch E. In practice any wheel having a flat spot that will seat the edge from E to the notch H, and is, therefore, two and one-half inches in length, is condemned.

This invention is designed to provide means by which other tests may be made, and these means comprise a bar 1 pivotally mounted as shown at 2 on the plate A and having an offset 3 at its free end that extends perpendicularly to the bar 1 as shown. Both sides of the bar 1 and offset 3 are calibrated as shown in the drawings in inches and fractions of an inch, and said calibrations intercept both edges of the bar and offset for convenience in the use of the tool in making various measurements. Pivotally mounted on bar 1, and intermediate of its ends, is an arm 4, 5 indicating the pivot for said arm.

In Figure 5 the gauge is shown in use to measure the depth of groove cut in the tread of the wheel by the rails, the arm 4 being turned downwardly and the edge of the plate A seated on the tread of the wheel A. In practice a wheel is not condemned until the groove cut in its tread is more than five-sixteenths of an inch deep at any point, the plate A is calibrated in sixteenths of an inch as shown at 6 intermediate of the ends of the bar 1, and at 7 in line with the end of the offset portion 3. A normally unworn wheel will when the gauge is arranged as shown in Figure 5 raise the bar 1 so that it will be in line with the upper one of the calibrations 6, and when the depth of the groove cut is such that the calibration indicating five-sixteenths of an inch from the upper line is exposed, the wheel is then unfit for further service until it has been retired. The calibrations 7 may be used if preferred either independently of or in conjunction with the calibrations 6, it being apparent that each movement of the bar to uncover one of the calibrations 6 will uncover two of the calibrations 7, so that each of the calibrations 7 may be utilized to measure thirty-seconds of an inch in the depth of the groove at the end of the arm 4.

In addition to the use of the device as illustrated in Figure 5, rod 1 may be utilized for measuring the thickness of the tire of the wheel by arranging the rod in a position at 180 degrees from that shown in Figure 1 and using the adjacent edge of the plate A as a rest for the gauge, and also that the offset end 3 may be utilized to true the tire on the cast hub or wheel preliminary to shrinking it and to measure the play between the journal box and locomotive wheel to determine whether or not the side play of the wheel is excessive for safety.

What is claimed is:—

A wheel gauge including a plate, a bar pivotally engaging said plate at one of its ends, an arm pivotally engaging the bar and adapted to assume a position perpendicular to the edge of the bar, there being graduations on said plate to cooperate with an edge of the bar to indicate the distance the free end of said arm projects beyond an edge of the plate.

In testimony whereof I affix my signature.

LUTHER R. FERGUSON.